(12) United States Patent
Tayebati et al.

(10) Patent No.: US 6,404,969 B1
(45) Date of Patent: Jun. 11, 2002

(54) OPTICAL SWITCHING AND ATTENUATION SYSTEMS AND METHODS THEREFOR

(75) Inventors: Parviz Tayebati, Watertown; Daryoosh Vakhshoori, Cambridge, both of MA (US); Masud Azimi, Nashua, NH (US)

(73) Assignee: Coretek, Inc., Wilmington, MA (US)

( * ) Notice: Subject to any disclaimer, the term of this patent is extended or adjusted under 35 U.S.C. 154(b) by 0 days.

(21) Appl. No.: 09/281,406

(22) Filed: Mar. 30, 1999

(51) Int. Cl.[7] .................................................. G02B 6/26
(52) U.S. Cl. ........................ 385/140; 385/18; 359/223; 359/198; 359/230
(58) Field of Search ................... 385/140, 18; 359/223, 359/224, 198–199, 212, 230

(56) References Cited

U.S. PATENT DOCUMENTS

| | | | | |
|---|---|---|---|---|
| 5,329,103 A | * | 7/1994 | Rando | 359/223 |
| 5,903,380 A | * | 5/1999 | Motamedi et al. | 359/223 |
| 5,960,132 A | * | 9/1999 | Lin | 385/18 |

* cited by examiner

*Primary Examiner*—James Phan
(74) *Attorney, Agent, or Firm*—Pandiscio & Pandiscio

(57) ABSTRACT

Novel light switches and attenuators are disclosed. In one form of the invention, a novel 2×2 crossbar switch is formed by positioning a movable reflector intermediate four fiberoptic lines. In another form of the invention, a 1×N switch is formed by providing a plurality of cantilevers each having a reflective surface thereon. In still another form of the invention, a novel light attenuator is formed by positioning a movable arm intermediate two fiberoptic elements.

8 Claims, 4 Drawing Sheets

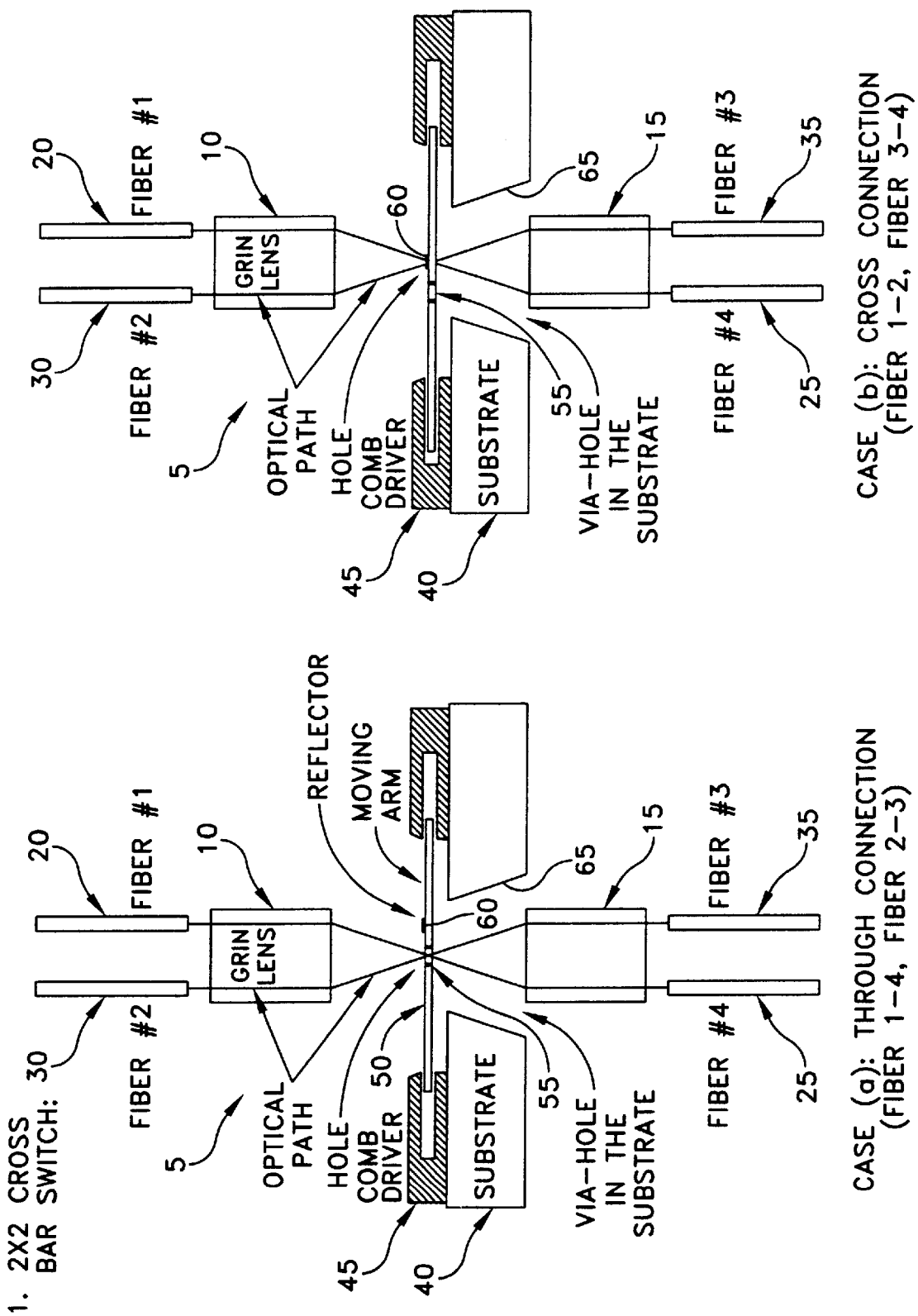

ANGLED FIBER HOLDER
DELIVERY SYSTEM

US 6,404,969 B1

OPTICAL SWITCHING AND ATTENUATION SYSTEMS AND METHODS THEREFOR

REFERENCE TO EARLIER APPLICATIONS

This application claims the benefit of pending prior U.S. Provisional Patent Application Serial. No. 60/079,994, filed Mar. 30, 1998, by Tayebati et al., entitled OPTICAL SWITCHING USING MICRO-ELECTROMECHANICAL TECHNIQUE; and pending prior U.S. Provisional Patent Application Serial No. 60/105,940, filed Oct. 28, 1998 by Azimi et al., entitled VARIABLE OPTICAL ATTENUATOR. The two aforementioned documents are hereby incorporated herein by reference.

FIELD OF THE INVENTION

This invention relates to optical systems in general, and more particularly to switches and attenuators for use in optical systems.

BACKGROUND OF THE INVENTION

In many situations, it is necessary to switch or attenuate a light signal within an optical system.

By way of example but not limitation, in a typical optical system, it may be necessary to switch a light signal between a first line and a second line.

By way of further example but not limitation, in a typical optical system, it may be necessary to attenuate a light signal passing through a line.

OBJECTS OF THE INVENTION

One object of the present invention is to provide novel apparatus for switching a light signal in an optical system.

Another object of the present invention is to provide novel apparatus for attenuating a light signal in an optical system.

Still another object of the present invention is to provide a novel method for switching a light signal in an optical system.

Yet another object of the present invention is to provide a novel method for attenuating a light signal in an optical system.

SUMMARY OF THE INVENTION

These and other objects of the present invention are addressed by the provision and use of novel light switches and attenuators. In one form of the invention, a novel 2×2 crossbar switch is formed by positioning a movable reflector intermediate four fiberoptic lines. In another form of the invention, a 1×N switch is formed by providing a plurality of cantilevers each having a reflective surface thereon. In still another form of the invention, a novel light attenuator is formed by positioning a movable arm intermediate two fiberoptic elements.

BRIEF DESCRIPTION OF THE DRAWINGS

Still other objects and features of the present invention will be more fully disclosed or rendered obvious by the following detailed description of the preferred embodiments of the invention, which is to be considered together with the accompanying drawings, wherein like numbers refer to like parts and further wherein:

FIG. 1 is a schematic side view showing a novel 2×2 crossbar switch in a first state;

FIG. 2 is a schematic side view showing the 2×2 crossbar switch of FIG. 1 in a second state;

DETAILED DESCRIPTION OF THE PREFERRED EMBODIMENTS

Figure 3:
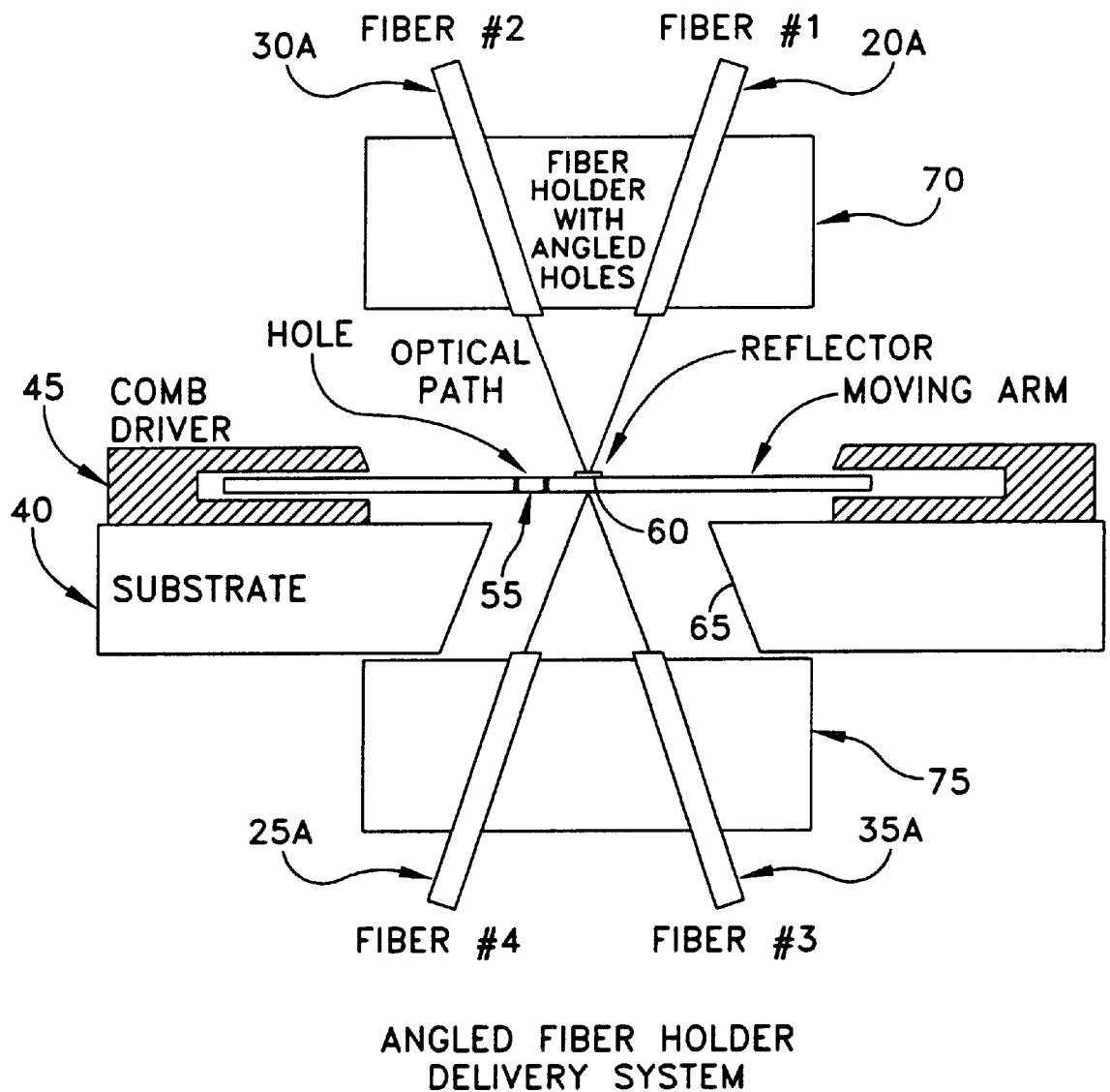
FIG. 3 is a schematic side view showing an alternative form of 2×2 crossbar switch.

Looking first at FIG. 1, there is shown a novel 2×2 crossbar switch 5 formed in accordance with the present invention. Crossbar switch 5 utilizes a first lens 10 and a second lens 15 to connect a fiberoptic element 20 with a fiberoptic element 25, and to connect a fiberoptic element 30 with a fiberoptic element 35, when the 2×2 crossbar switch is in the state shown in FIG. 1.

In accordance with the present invention, a substrate 40 is positioned between lenses 10 and 15. Substrate 40 carries a comb drive 45 or some other type of actuation and a moving arm 50 thereon. A hole 55 is formed in moving arm 50 so that light can pass between fiberoptic element 20 and fiberoptic element 25, and fiberoptic element 30 and fiberoptic element 35, when the 2×2 crossbar switch is in the position shown in FIG. 1. A reflector 60, spaced from hole 55, is also carried by moving arm 55.

In accordance with the present invention, when crossbar switch 5 is to be activated, comb drive 45 is activated so as to move moving arm 50, whereby to position reflector 60 at the location where hole 55 previously sat. Reflector 60 causes fiberoptic element 20 to be connected to fiberoptic element 30, and fiberoptic element 25 to be connected to fiberoptic element 35, when the 2×2 crossbar switch is in the state shown in FIG. 2.

Stated another way, in the switch state shown in FIG. 1, the light signal from fiberoptic element 20 goes through hole 55 in actuating (moving) arm 55 of comb drive 45 and couples to fiberoptic element 25. Similarly, fiberoptic element 30 is coupled to fiberoptic element 35. This is the "through connect" situation. When voltage is applied to comb drive 45, arm 50 moves to a new position and brings reflector 60 in the path of the light beams, so that the switch is in the state shown in FIG. 2. In this condition, a light signal from fiberoptic element 20 is reflected and couples back to fiberoptic element 30 and, in similar fashion, fiberoptic element 35 will be coupled to fiberoptic element 25. FIG. 2 represents the "cross bar switching" state of the switch.

The via-hole 65 in substrate 40 provides low insertion loss for the switch. Alternatively, substrate 40 can be anti-reflection coated.

The Grin-lenses 10 and 15 provide the proper bending of the light as shown in FIGS. 1 and 2. Alternatively, thermally expanded core (TEC) fiberoptic elements 20A, 25A, 30A and 35A can be used with appropriate mounts 70, 75 as shown in FIG. 3.

Figure 4:
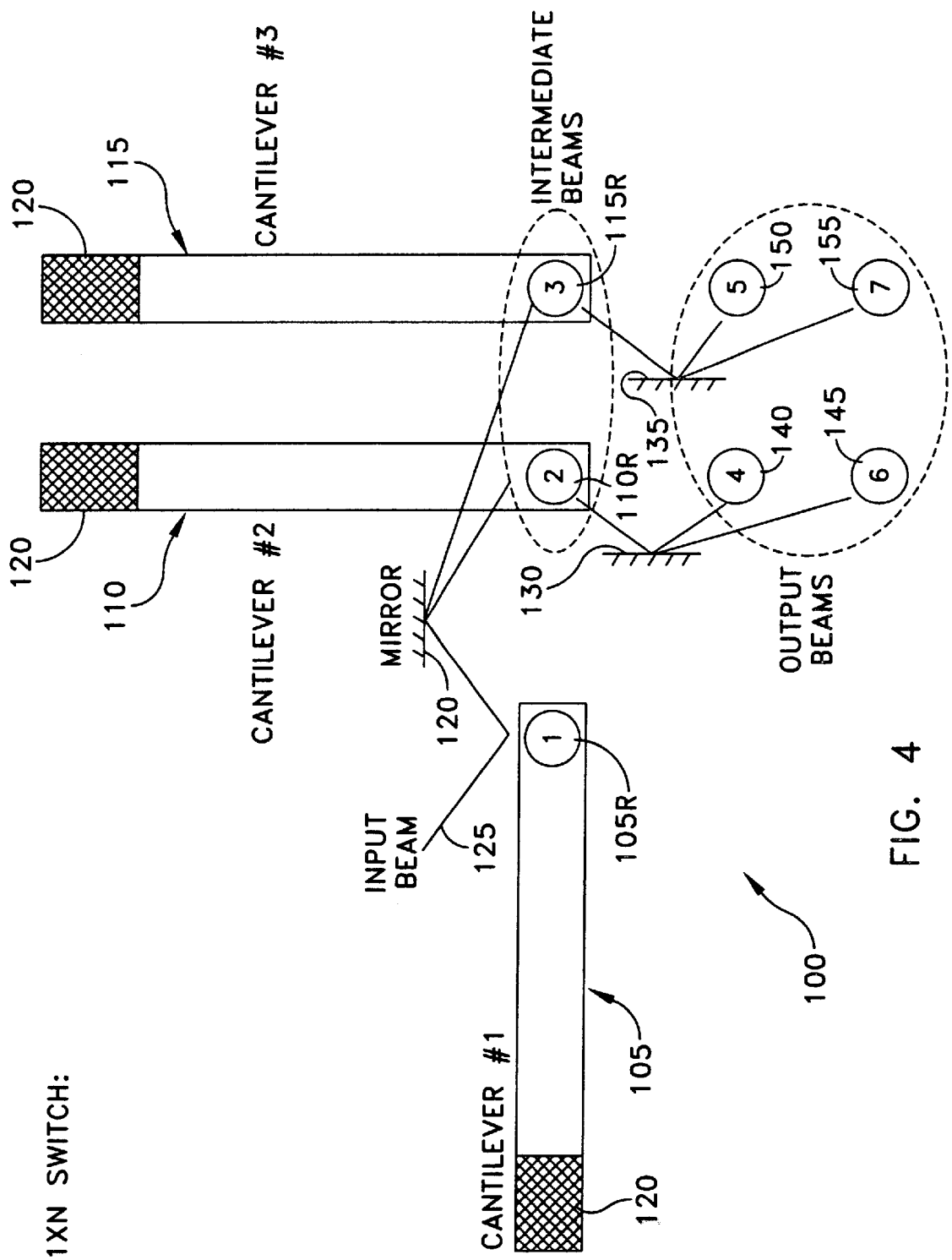
FIG. 4 is a schematic view showing a 1×N optical switch formed by a plurality of cantilevers.

Looking next at FIG. 4, there is shown a novel 1×N switch 100. Switch 100 utilized three cantilevers 105, 110 and 115 formed on a substrate 120. Cantilevers 105, 110 and 115 have reflective regions 105R, 110R and 115R formed thereon, respectively. Cantilevers 105, 110 and 115 are positioned relative to one another, and relative to a reflective surface (e.g., a mirror) 120, such that when the cantilevers are in a first state, an input beam 125 may be reflected off cantilever reflective region 105R and reflective surface 120 so as to land on cantilever reflective region 110R. However, when cantilever 105 is moved to a second position, e.g., by the application of an electric field, input beam 125 may be reflected off cantilever reflective region 105R and reflective surface 120 so as to land on cantilever reflective region 115R.

In the same way, properly positioned reflective surfaces 130 and 135 can direct light from reflective surface 110R and 115R to output ports 140/145 and 150/155, respectively, depending on the position of cantilevers 110 and 115, respectively.

Stated another way, input beam 125 reflects off the tip of cantilever 105. This reflected beam is further reflected by surface 120 placed at an appropriate position, i.e., on top of the cantilevers. Hence, by double reflection, the beam 125 can land on reflective surface 110R on the tip of cantilever 110. With an applied voltage to cantilever 115, the beam can be switched to reflective surface 115R on cantilever 115. In similar fashion, the beam 125 reflecting off cantilever 110 can be routed (via reflective surface 130) to positions 140 or 145 by the application of appropriate voltage to cantilever 110; or the beam 125 reflecting off cantilever 115 can be routed (via reflective surface 135) to positions 150 and 155 by the application of appropriate voltage to cantilever 115. In this way, the input beam 125 can be selectively switched (i.e., routed) to output ports 140, 145, 150, and 155, as desired.

Figure 5:
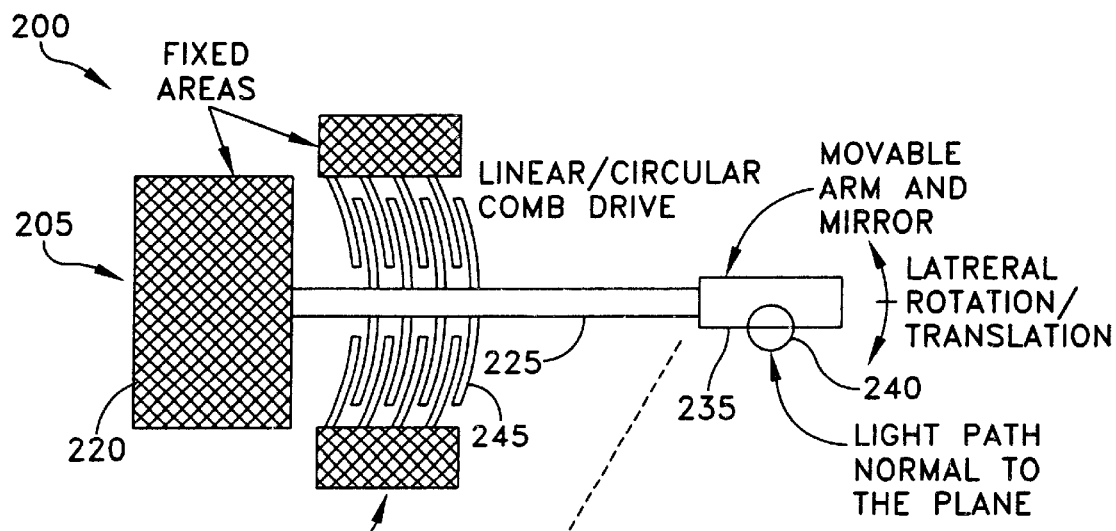
FIG. 5 is a schematic view showing a novel light attenuator formed in accordance with the present invention.
Figure 6:
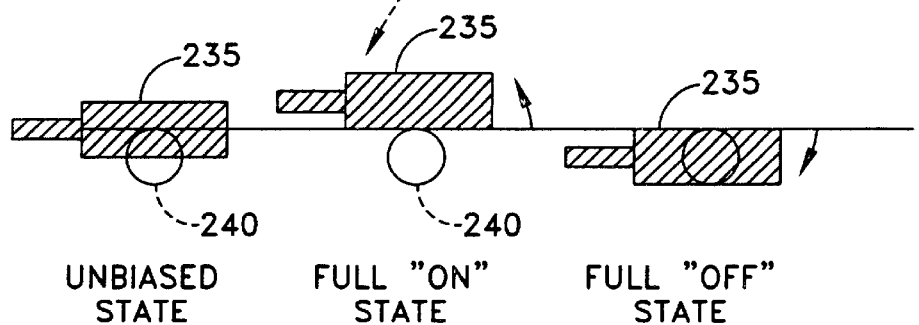
FIG. 6 is a schematic view showing a portion of the light attenuator of FIG. 5 in various states of operation.
Figures 7, 8:
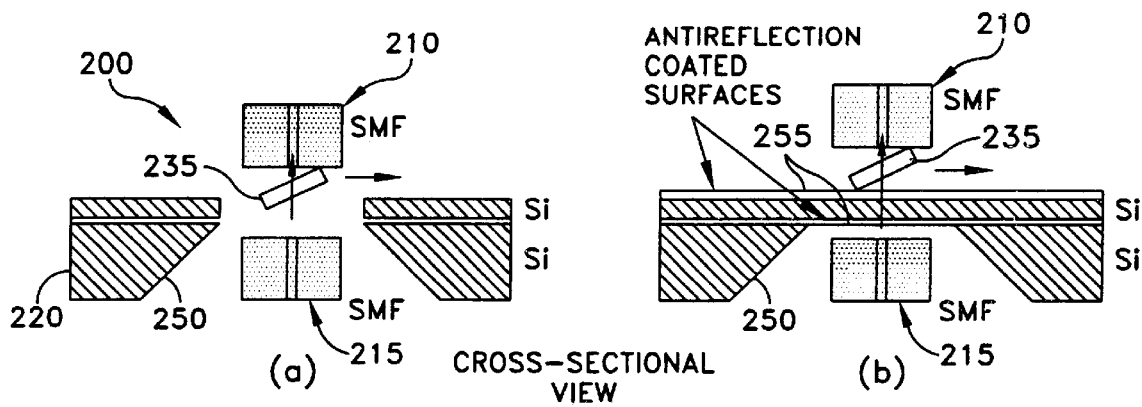
FIG. 7 is a schematic view showing the light attenuator of FIGS. 5 and 6 positioned between two fiberoptic elements.
FIG. 8 is a schematic view showing the light attenuator of FIGS. 5 and 6 used in an alternative setting.

Looking next at FIGS. 5–7, there is shown an optical attenuator 200 also formed in accordance with the present invention. Optical attenuator 200 comprises a so-called "MEM's" (microelectromechanical) structure 205 disposed between two single mode fibers 210 and 215. More particularly, MEM's structure 205 comprises a substrate 220 having an arm 225 extending therefrom, and an actuator 230 for moving arm 225 into and out of position between fibers 210 and 215, whereby to selectively position the arm's mirror 235 into and out of the light path 240 extending between the two fibers (FIG. 6). The substrate 220 on which the microelectromechanically-activated arm 225 is fabricated is positioned perpendicular to the optical axis of the fibers (FIG. 7).

The actuator, 230 may be any available electromechanical, thermal or magnetic based actuator. One example of an electromechanical actuator is the comb drive 245 shown in FIG. 5. Mirror 235 may be positioned parallel to the substrate 220, or preferably at an angle to the substrate, so as to avoid back reflection of the light back into the fiber.

In order to allow efficient coupling of light between fibers 210 and 215, the substrate 220 has a via hole 250 (FIG. 7) on the back to allow the two fibers to be brought close to the arm 225 and to each other.

The MEM's structure 205 is designed such the light passing through the substrate 220 undergoes no residual reflections from the non-moving part. For example, the device is fabricated such that after processing, no part of the substrate 220 remains between the two fibers (FIG. 7) or the front and the back of the remaining part of the substrate are antireflection (AR) coated as shown at 255 using Si/SiO$_2$ or other multilayer films (FIG. 8).

What is claimed is:

1. In combination with a pair of fiber optic lines arranged for transmission of light from the end of one line to the end of the other line according to a predetermined light path, an optical attenuator for attenuating light passing from said one line to said other line, said optical attenuator comprising:
   a support; and
   a microelectromechanical structure carried by said support, said microelectromechanical structure comprising (a) a cantilever arm having one end that is fixed relative to said support and an opposite end that extends transversely to said light path and is free to move relative to said support and said light path, (b) a mirror attached to said opposite end of said arm, said mirror being attached solely to said arm, and (c) electrically operable means for moving said arm so as to cause said opposite end and said mirror to swing in an arc relative to said support, said arm being disposed so that it extends at a right angle to said light path and said electrically operable means being operable to move said arm in said arc so as to move said mirror into and out of said light path to selectively attenuate transmission of light passing from one fiber optic line toward the other fiber optic line.

2. The combination according to claim 1 wherein said fiber optic lines are disposed in end-to-end aligned relation with one another with a space therebetween.

3. The combination according to claim 1 wherein said support is disposed between said fiber optic lines.

4. The combination according to claim 1 wherein said support has an aperture located between adjacent ends of said fiber optic lines, whereby to facilitate transmission of light from the end of one fiber optic line to the adjacent end of the other fiber optic line.

5. The combination according to claim 1 wherein said support has an antireflection coating to prevent reflections of light therefrom.

6. The combination according to claim 1 wherein said electrically operated means is a comb drive.

7. The combination according to claim 1 wherein said electrically operated means moves said arm and mirror in a plane that extends perpendicular to said light path, and said mirror is disposed at an angle to said plane so that it will not reflect light back to said one fiber optic line.

8. An optical attenuator comprising:
   a support;
   an arm having first and second opposite ends with said first end being secured to said support;
   a mirror attached to said second end of said arm, said mirror being supported solely by said arm; and
   microelectromechanical means for moving said second end of said arm so as to selectively position said mirror across a light path extending between two light transmitting elements, whereby said mirror will intercept and reflect light traveling along said light path, wherein said microelectromechanical means is a comb drive.

* * * * *